United States Patent Office 2,771,444

Patented Nov. 20, 1956

2,771,444

PROCESS FOR BREAKING PETROLEUM EMULSIONS EMPLOYING CERTAIN AMINE-MODIFIED THERMOPLASTIC PHENOL-ALDEHYDE RESIN SALTS

Melvin De Groote, University City, Mo., assignor to Petrolite Corporation, Wilmington, Del., a corporation of Delaware

No Drawing. Application January 2, 1953, Serial No. 329,486

18 Claims. (Cl. 252—341)

The present invention is a continuation-in-part of my two co-pending applications, Serial No. 288,746, filed May 19, 1952, now abandoned, and Serial No. 296,087, filed June 27, 1952, now U. S. Patent 2,679,488.

My invention provides an economical and rapid process for resolving petroleum emulsions of the water-in-oil type, that are commonly referred to as "cut-oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

My aforementioned co-pending application, Serial No. 296,087, filed June 27, 1952, is concerned with a process for breaking petroleum emulsions of the water-in-oil type characterized by subjecting the emulsion to the action of a demulsifier including certain amino resin condensates therein described.

My present invention is concerned with demulsification which involves the use of the aforementioned amino resin condensate in the form of a gluconic acid salt, i. e., a form in which all or part of the basic nitrogen atoms are neutralized with gluconic acid, i. e., converted into the salt of gluconic acid.

Needless to say, all that is required is to prepare the amine resin condensates in the manner described in the two aforementioned co-pending applications, and then neutralize with gluconic acid which, for practical purposes is as simple as analogous inorganic reactions.

As far as the use of the herein described products goes for purpose of resolution of petroleum emulsions of the water-in-oil type, I particularly prefer to use the gluconic acid salt of those members which have sufficient hydrophile character to meet at least the test as set forth in U. S. Patent No. 2,499,368, dated March 7, 1950, to De Groote et al. In said patent such test for emulsification using a water-insoluble solvent, generally xylene, is described as an index of surface activity.

The present invention involves the surface-activity of the gluconic acid salts, i. e., either where only one basic amino nitrogen atom is neutralized or where all basic amino nitrogen atoms are neutralized. Such gluconic acid salts may not necessarily be xylene-soluble. If such compounds are not xylene-soluble the obvious chemical equivalent or equivalent chemical test can be made by simply using some suitable solvent, preferably a water-soluble solvent such as ethylene glycol diethylether, or a low molal alcohol, or a mixture to dissolve the appropriate product being examined and then mix with the equal weight of xylene, followed by addition of water. Such test is obviously the same for the reason that there will be two phases on vigorous shaking and surface activity makes its presence manifest. It is understood the reference in the hereto appended claims as to the use of xylene in the emulsification test includes such obvious variant.

For convenience, what is said hereinafter will be divided into six parts:

Part 1 is concerned with the general structure of the amine-modified resins which are converted into the gluconic acid salt;

Part 2 is concerned with the phenol-aldehyde resin which is subjected to modification by condensation reaction to yield the amine-modified resin;

Part 3 is concerned with suitable basic amidines which may be employed in the preparation of the herein described amine-modified resins;

Part 4 is concerned with the reactions involving the resin, the amidine, and formaldehyde to produce the specific products or compounds which are neutralized subsequently with gluconic acid;

Part 5 is concerned with the conversion of the basic condensate into the corresponding salt of gluconic acid;

Part 6 is concerned with the resolution of petroleum emulsions of the water-in-oil type by means of the previously described chemical compounds or reactions products in the form of gluconic acid salts.

PART 1

The compounds herein described and particularly useful as demulsifying agents are gluconic acid salts of the condensates generically described above and in detail in applications Serial Nos. 288,746 and 296,087 to which reference is made.

These resins may be exemplified by an idealized formula which may, in part, be an over-simplification in an effort to present certain resin structure. Such formula would be the following:

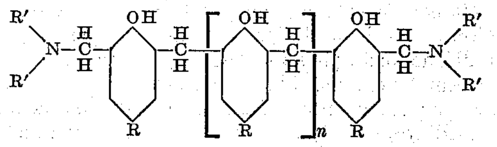

in which R represents an aliphatic hydrocarbon substituent generally having four and not over 18 carbon atoms but most preferably not over 14 carbon atoms, and *n* generally is a small whole number varying from 1 to 4. In the resin structure it is shown as being derived from formaldehyde although obviously other aldehydes are equally satisfactory. The amine residue in the above structure is derived from either a substituted imidazoline or a substituted tetrahydropyrimidine as previously specified and may be indicated thus:

in which HN< represents a reactive secondary amino group and two occurrences of R′ represent the remainder of the molecule. Stated another way, what has been depicted in the above formula is an over-simplification as far as the ring compound is concerned which is obvious by reference to a more elaborate formula depicting the actual structure of typical members of the group, such as:

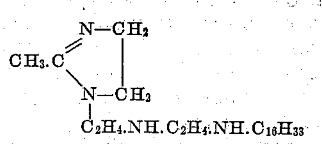

2-methyl,1-hexadecylaminoethylaminoethylimidazoline

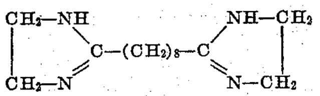

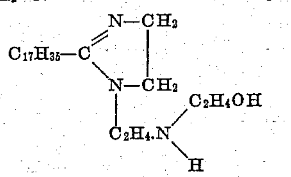

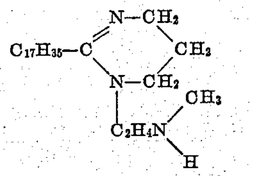

2-heptadecyl,1-methylaminoethyl tetrahydropyrimidine

The introduction of two such ring compound radicals into a comparatively small resin molecule, for instance, one having 3 to 6 phenolic nuclei as specified, alters the product in a number of ways. In the first place, a basic nitrogen atom, of course, adds a hydrophile effect; in the second place, depending on the size of the radical R', there may be a counterbalancing hydrophobe effect or one in which the hydrophobe effect more than counterbalances the hydrophile effect of the nitrogen atom. Finally, in such cases where R' contains one or more oxygen atoms, another effect is introduced, particularly another hydrophile effect. In such instances where there are hydroxyl groups present, needless to say there is a further hydrophile effect introduced.

The resins employed as raw materials in the instant procedure are characterized by the presence of an aliphatic radical in the ortho or para position, i. e., the phenols themselves are difunctional phenols.

The resins herein employed contain only two terminal groups which are reactive to formaldehde, i. e., they are difunctional from the standpoint of methylol-forming reactions. As is well known, although one may start with difunctional phenols, and depending on the procedure employed, one may obtain cross-linking which indicates that one or more of the phenolic nuclei have been converted from a difunctional radical to a trifunctional radical, or in terms of the resin, the molecule as a whole has a methylol-forming reactivity greater than 2. Such shift can take place after the resin has been formed or during resin formation. Briefly, an example is simply where an alkyl radical, such as methyl, ethyl, propyl, butyl, or the like, shifts from an ortho position to a meta position, or from a para position to a meta position. For instance, in the case of phenol-aldehyde varnish resins, one can prepare at least some in which the resins, instead of having only two points of reaction can have three, and possibly more points of reaction, with formaldehyde, or any other reactant which tends to form a methylol or substituted methylol group.

The resins herein employed are soluble in a non-oxygenated hydrocarbon solvent, such as benzene or xylene.

The resins herein employed as raw materials must be comparatively low molal products having on the average 3 to 6 nuclei per resin molecule.

The condensation products here obtained, whether in the form of the free base or the salt, do not go over to the insoluble stage on heating. The condensation product obtained according to the present invention is heat stable and, in fact, one of its outstanding qualities is that it can be subjected to oxyalkylation, particularly oxyethylation or oxypropylation, under conventional conditions, i. e., presence of an alkaline catalyst, for example, but in any event at a temperature above 100° C. without becoming an insoluble mass.

What has been said previously in regard to heat stability, particularly when employed as a reactant for preparation of derivatives, is still important from the standpoint of manufacture of the condensation products themselves insofar that in the condensation process employed in preparing the compounds described subsequently in detail, there is no objection to the employing of a temperature above the boiling point of water. As a matter of fact, all the examples included subsequently employ temperatures going up to 140° to 150° C.

What is said above deserves further amplification at this point for the reason that it may shorten what is said subsequently in regard to the production of the herein described condensation products. Since formaldehyde generally is employed economically in an aqueous phase (30% to 40% solution, for example) it is necessary to have manufacturing procedure which will allow reactions to take place at the interface of the two immiscible liquids, to wit, the formaldehyde solution and the resin solution, on the assumption that generally the amine will dissolve in one phase or the other. Although reactions of the kind herein described will begin at least at comparatively low temperatures, for instance, 30° C., 40° C., or 50° C., yet the reaction does not go to completion except by the use of the higher temperatures. The use of higher temperatures means, of course, that the condensation product obtained at the end of the reaction must not be heat-reactive. Of course, one can add an oxygenated solvent such as alcohol, dioxane, various ethers of glycols, or the like, and produce a homogeneous phase. If this latter procedure is employed in preparing the herein described condensations it is purely a matter of convenience, but whether it is or not, ultimately the temperature must still pass within the zone indicated elsewhere, i. e., somewhere above the boiling point of water unless some obvious equivalent procedure is used.

Any reference, as in the hereto appended claims, to the procedure employed in the process is not intended to limit the method or order in which the reactants are added, commingled or reacted. The procedure has been referred to as a condensation process for obvious reasons. As pointed out elsewhere it is my preference to dissolve the resin in a suitable solvent, add the amine, and then add the formaldehyde as a 37% solution. However, all three reactants can be added in any order. I am inclined to believe that in the presence of a basic catalyst, such as the amine employed, that the formaldehyde produces methylol groups attached to the phenolic nuclei which, in turn, react with the amine. It would be immaterial, of course, if the formaldehyde reacted with the amine so as to introduce a methylol group attached to nitrogen which, in turn, would react with the resin molecule. Also, it would be immaterial if both types of compounds were formed which reacted with each other with the evolution of a mole of formaldehyde available for further reaction. Furthermore, a reaction could take place in which three different molecules are simultaneously involved although, for theoretical reasons, that is less likely. What is said herein in this respect is simply by way of explanation to avoid any limitation in regard to the appended claims.

PART 2

It is well known that one can readily purchase on the open market, or prepare, fusible, organic solvent-soluble, water-insoluble resin polymers of a composition approximated in an idealized form by the formula

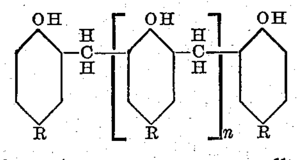

In the above formula $n$ represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., *n* varies from 1 to 4; R represents an aliphatic hydrocarbon substituent, generally an alkyl radical having from 4 to 14 carbon atoms, such as a butyl, amyl, hexyl, decyl or dodecyl radical. Where the divalent bridge radical is shown as being derived from formaldehyde it may, of course, be derived from any other reactive aldehyde having 8 carbon atoms or less.

The resins herein employed as raw materials must be soluble in a nonoxygenated solvent, such as benzene or xylene. This presents no problem insofar that all that is required is to make a solubility test on commercially available resins, or else prepare resins which are xylene- or benzene-soluble as described in aforementioned U. S. Patent No. 2,499,365, or in U. S. Patent No. 2,499,368, dated March 7, 1950, to De Groote and Keiser.

If one selected a resin of the kind just described previously and reacted approximately one mole of the resin with two moles of formaldehyde and two moles of a basic nonhydroxylated secondary amine as specified, following the same idealized over-simplification previously referred to, the resultant product might be illustrated thus:

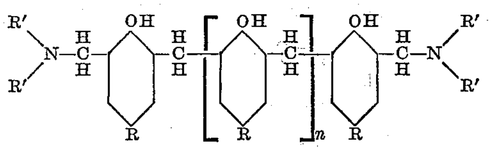

The basic amine may be designated thus:

subject to what has been said previously as to the presence of a substituted imidazoline or a substituted tetrahydropyrimidine radical having at least one basic secondary amine radical present and that the ring compound, or rather the two occurrences of R′ jointly with *n*, be free from a primary amine radical. However, if one attempts to incorporate into the formula

a structure such as a substituted imidazoline or substituted tetrahydropyrimidine such as the following:

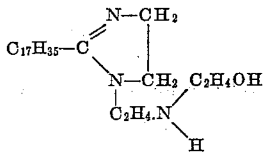

then one becomes involved in added difficulties in presenting an overall picture. Thus, for sake of simplicity the ring compound having the reactive secondary amino group will be depicted as

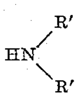

subject to the limitation and explanation previously noted.

In conducting reactions of this kind one does not necessarily obtain a hundred per cent yield for obvious reasons. Certain side reactions may take place. For instance, 2 moles of amine may combine with one mole of the aldehyde, or only one mole of the amine may combine with the resin molecule, or even to a very slight extent, if at all, 2 resin units may combine without any amine in the reaction product, as indicated in the following formulas:

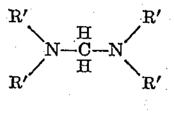

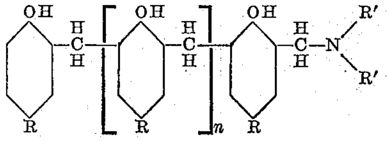

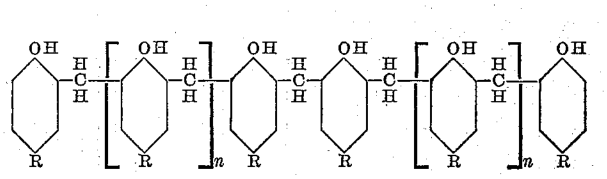

As has been pointed out previously, as far as the resin unit goes one can use a mole of aldehyde other than formaldehyde, such as acetaldehyde, propionaldehyde or butyraldehyde. The resin unit may be exemplified thus:

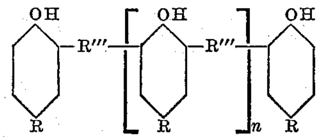

in which R‴ is the divalent radical obtained from the particular aldehyde employed to form the resin. For reasons which are obvious the condensation product obtained appears to be described best in terms of the method of manufacture.

As previously stated the preparation of resins, the kind herein employed as reactants, is well known. See previously mentioned U. S. Patent 2,499,368. Resins can be made using an acid catalyst or basic catalyst or a catalyst having neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although I have found that sometimes the reaction described proceeded more rapidly in the presence of a small amount of a free base. The amount may be as small as a 200th of a percent and as much as a few 10ths of a percent. Sometimes moderate increase in caustic soda and caustic potash may be used. However, the most desirable procedure in practically every case is to have the resin neutral.

In preparing resins one does not get a single polymer, i.e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for *n* as, for example, 3.5, 4.5 or 5.2.

In the actual manufacture of the resins I found no reason for using other than those which are lowest in price and most readily available commercially. For purposes of convenience suitable resins are characterized in the following table:

TABLE I

| Example number | R | Position of R | R''' derived from— | $n$ | Mol. wt. of resin molecule (based on $n+2$) |
|---|---|---|---|---|---|
| 1a | Phenyl | Para | Formaldehyde. | 3.5 | 992.5 |
| 2a | Tertiary butyl | do | do | 3.5 | 882.5 |
| 3a | Secondary butyl | Ortho | do | 3.5 | 882.5 |
| 4a | Cyclo-hexyl | Para | do | 3.5 | 1,025.5 |
| 5a | Tertiary amyl | do | do | 3.5 | 959.5 |
| 6a | Mixed secondary and tertiary amyl. | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde. | 3.5 | 845.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde. | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde. | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |
| 28a | Tertiary amyl | do | do | 1.5 | 604.0 |
| 29a | Cyclo-hexyl | do | do | 1.5 | 646.0 |
| 30a | Hexyl | do | do | 1.5 | 653.0 |
| 31a | do | do | Acetaldehyde. | 1.5 | 688.0 |
| 32a | Octyl | do | do | 1.5 | 786.0 |
| 33a | Nonyl | do | do | 1.5 | 835.0 |
| 34a | Octyl | do | Butyraldehyde. | 2.0 | 986.0 |
| 35a | Nonyl | do | do | 2.0 | 1,028.0 |
| 36a | Amyl | do | do | 2.0 | 860.0 |
| 37a | Butyl | do | Formaldehyde. | 2.0 | 636.0 |
| 38a | Amyl | do | do | 2.0 | 692.0 |
| 39a | Hexyl | do | do | 2.0 | 748.0 |
| 40a | Cyclo-hexyl | do | do | 2.0 | 740.0 |

PART 3

The expression "cyclic amidines" is employed in its usual sense to indicate ring compounds in which there are present either 5 members or 6 members, and having 2 nitrogen atoms separated by a single carbon atom supplemented by either two additional carbon atoms or three additional carbon atoms completing the ring. All the carbon atoms may be substituted. The nitrogen atom of the ring involving two monovalent linkages may be substituted. Needless to say, these compounds include members in which the substituents also may have one or more nitrogen atoms, either in the form of amino nitrogen atoms or in the form of acylated nitrogen atoms. Reference is made to application Serial No. 296,087 for detailed description of suitable amidines and their preparation.

Examples selected include the following:

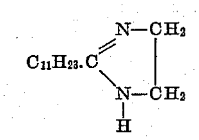 (1)

2-undecylimidazoline

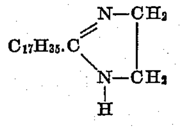 (2)

2-heptadecylimidazoline

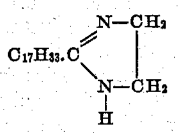 (3)

2-oleylimidazoline

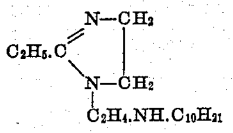 (4)

1-N-decylaminoethyl,2-ethylimidazoline

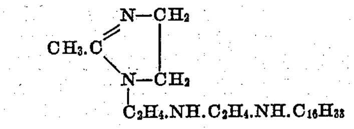 (5)

2-methyl,1-hexadecylaminoethylaminoethylimidazoline

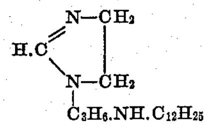 (6)

1-dodecylaminopropylimidazoline

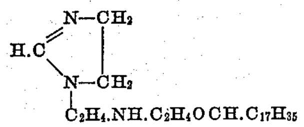 (7)

1-(stearoyloxyethyl)aminoethylimidazoline

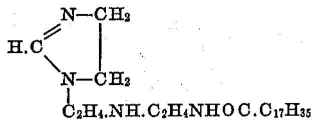 (8)

1-stearamidoethylaminoethylimidazoline

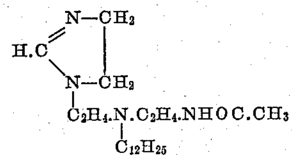 (9)

1-(N-dodecyl)-acetamidoethylaminoethylimidazoline

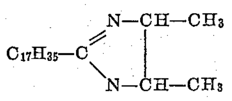 (10)

2-heptadecyl,4,5-dimethylimidazoline

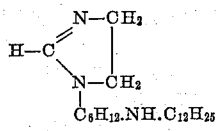 (11)

1-dodecylaminohexylimidazoline

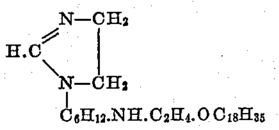 (12)

1-stearoyloxyethylaminohexylimidazoline

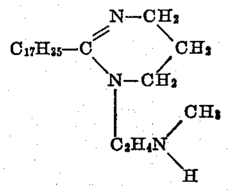 (13)

2-heptadecyl,1-methylaminoethyl tetrahydropyrimidine

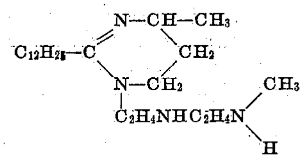

(14)

4-methyl,2-dodecyl,1-methylaminoethylaminoethyl tetrahydropyrimidine

As has been pointed out previously, the reactants herein employed may have two substituted imidazoline rings or two substituted tetrahydropyrimidine rings. Such compounds are illustrated by the following formula:

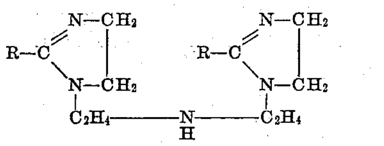

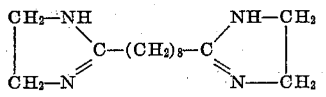

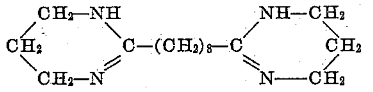

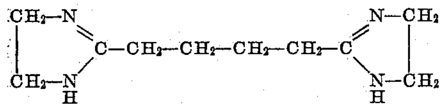

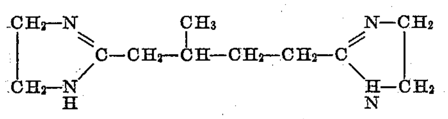

As to compounds having a tertiary amine radical, it is obvious that one can employ derivatives of polyamines in which the terminal groups are unsymmetrically alkylated. Initial polyamines of this type are illustrated by the following formula:

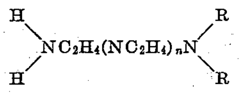

in which R represents a small alkyl radical such as methyl, ethyl, propyl, etc., and *n* represents a small whole number greater than unity such as 2, 3 or 4.

Ring compounds, such as substituted imidazolines, may be reacted with a substantial amount of alkylene oxide as noted in the preceding paragraph and then a secondary amino group introduced by two steps; first, reaction with an ethylene imine, and second, reaction with another mole of the oxide, or with an alkylating agent such as dimethyl sulfate, benzyl chloride, a low molal ester of a sulfonic acid, an alkyl bromide, etc.

Other suitable means may be employed to eliminate a terminal primary amino radical. If there is additionally a basic secondary amino radical present then the primary amino radical can be subjected to acylation notwithstanding the fact that the surviving amino group has no significant basicity. As a rule acylation takes place at the terminal primary amino group rather than at the secondary amino group, thus one can employ a compound such as

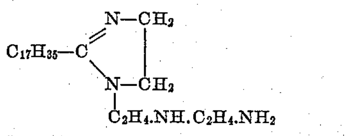

2-heptadecyl,1-diethylenediaminoimidazoline and subject it to acylation so as to obtain, for example, acetylated 2-heptadecyl,1-diethylenediaminoimidazoline of the following structure:

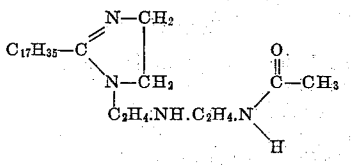

(15)

Similarly, a compound having no basic secondary amino radical but a basic primary amino radical can be reacted with a mole of an alkylene oxide, such as ethylene oxide, propylene oxide, glycide, etc., to yield a perfectly satisfactory reactant for the herein described condensation procedure. This can be illustrated in the following manner by a compound such as

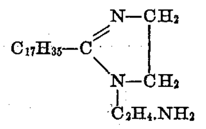

2-heptadecyl,1-aminoethylimidazoline which can be reacted with a single mole of ethylene oxide, for example, to produce the hydroxy ethyl derivative of 2-heptadecyl,1-amino-ethylimidazoline, which can be illustrated by the following formula:

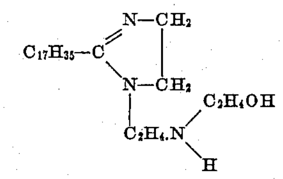

(16)

In the foregoing examples there is present a sizable hydrophobe group, for instance, heptadecyl groups, pentadecyl groups, octyl groups, nonyl groups, etc. etc.

One can obtain all these comparable derivatives from low molal acids, such as acetic, propionic, butyric, valeric, etc. Similarly, one can employ hydroxy acids such as glycolid acids, lactic acid, etc. Over and above this, one may employ acids which introduce a very distinct hydrophobe effect.

Examples of decreased hydrophobe character are exemplified by 2-methylimidazoline, 2-propylimidazoline, and 2-butylimidazoline, of the following structures:

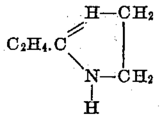

(17)

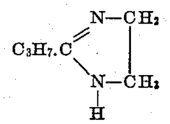

(18)

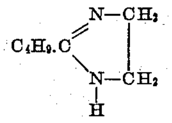

(19)

PART 4

The products obtained by the herein described processes represent cogeneric mixtures which are the result of a condensation reaction or reactions. Since the resin molecule cannot be defined satisfactorily by formula, although it may be so illustrated in an idealized simplification, it is difficult to actually depict the final product of the cogeneric mixture except in terms of the process itself. Reference is made to application Serial No. 296,087 for a detailed description of the reaction and the factors involved.

Little more need be said as to the actual procedure employed for the preparation of the herein described condensation products. The following example will serve by way of illustration:

*Example 1b*

The phenol-aldehyde resin is the one that has been identified previously as Example 2*a*. It was obtained from a para-tertiary butylphenol and formaldehyde. The resin was prepared using an acid catalyst which was completely neutralized at the end of the reaction. The molecular weight of the resin was 882.5. This corresponded to an average of about 3½ phenolic nuclei, as the value for *n* which excludes the 2 external nuclei, i. e., the resin was largely a mixture having 3 nuclei and 4 nuclei excluding the 2 external nuclei, or 5 and 6 overall nuclei. The resin so obtained in a neutral state had a light amber color.

882 grams of the resin identified as 2*a*, preceding, were powdered and mixed with a somewhat lesser amount of xylene, i. e., 600 grams. The mixture was refluxed until solution was complete. It was then adjusted to approximately 35° C. and 612 grams of 2-oleylimidazoline, previously shown in a structural formula as ring compound (3), were added. The mixture was stirred vigorously and formaldehyde added slowly. In this particular case the formaldehyde used was a 37% solution and 162 grams were added in approximately 3 hours. The mixture was stirred vigorously and kept within a range of approximately 40° to 44° C., for about 16½ hours. At the end of this time it was refluxed, using a phase-separating trap and a small amount of aqueous distillate withdrawn from time to time. The presence of unreacted formaldehyde was noted. Any unreacted formaldehyde seemed to disappear in approximately three hours after refluxing started. As soon as the odor of formaldehyde was no longer detectible the phase-separating trap was set so as to eliminate all the water of solution and reaction. After the water was eliminated part of the xylene was removed until the temperature reached approximately 148° C. The mass was kept at this higher temperature for 3 or 4 hours. During this time any additional water, which was probably water of reaction which had formed, was eliminated by means of the trap. The residual xylene was permitted to stay in the cogeneric mixture. A small amount of the sample was heated on a water bath to remove the excess xylene. The residual material was dark red in color and had the consistency of a thick sticky fluid or tacky resin. The overall reaction time was approximately 30 hours. In other examples it varied from as little as 24 hours up to approximately 38 hours. The time can be reduced by cutting the low temperature period to approximately 3 to 6 hours. Note that in Table II following there are a large number of added examples illustrating the same procedure. In each case the initial mixture was stirred and held at a fairly low temperature (30° to 40° C.) for a period of several hours. Then refluxing was employed until the odor of formaldehyde disappeared. After the odor of formaldehyde disappeared the phase-separating trap was employed to separate out all the water, both the solution and condensation. After all the water had been separated enough xylene was taken out to have the final product reflux for several hours somewhere in the range of 145° to 150° C., or thereabouts. Usually the mixture yielded a clear solution by the time the bulk of the water, or all of the water, had been removed.

Note that as pointed out previously, this procedure is illustrated by 24 examples in Table II.

TABLE II

| Ex. No. | Resin used | Amt., grs. | Amine used | Amt. of amine, grams | Strength of formaldehyde soln. and amt. | Solvent used and amt. | Reaction temp., ° C. | Reaction time (hrs.) | Max. distill. temp., ° C. |
|---|---|---|---|---|---|---|---|---|---|
| 1*b* | 2*a* | 882 | Amine 3 | 612 | 37%, 162 g | Xylene, 600 g | 20–25 | 30 | 148 |
| 2*b* | 5*a* | 480 | do | 306 | 37%, 81 g | Xylene, 450 g | 21–23 | 24 | 145 |
| 3*b* | 10*a* | 633 | do | 306 | do | Xylene, 600 g | 20–22 | 28 | 150 |
| 4*b* | 2*a* | 441 | Amine 4 | 281 | 30%, 100 g | Xylene, 400 g | 22–24 | 28 | 148 |
| 5*b* | 5*a* | 480 | do | 281 | do | Xylene, 450 g | 21–23 | 30 | 148 |
| 6*b* | 10*a* | 633 | do | 281 | 37%, 81 g | Xylene, 600 g | 21–25 | 26 | 146 |
| 7*b* | 2*a* | 441 | Amine 5 | 394 | do | Xylene, 400 g | 23–28 | 26 | 147 |
| 8*b* | 5*a* | 480 | do | 394 | do | Xylene, 450 g | 22–26 | 26 | 146 |
| 9*b* | 10*a* | 633 | do | 394 | do | Xylene, 600 g | 21–25 | 38 | 150 |
| 10*b* | 13*a* | 473 | Amine 13 | 379 | 30%, 100 g | Xylene, 450 g | 20–24 | 36 | 149 |
| 11*b* | 14*a* | 511 | do | 379 | do | Xylene, 500 g | 21–22 | 24 | 142 |
| 12*b* | 15*a* | 665 | do | 379 | do | Xylene, 650 g | 20–21 | 26 | 145 |
| 13*b* | 2*a* | 441 | Amine 16 | 395 | 38%, 81 g | Xylene, 425 g | 22–28 | 28 | 146 |
| 14*b* | 5*a* | 480 | do | 395 | 37%, 81 g | Xylene, 450 g | 23–30 | 27 | 150 |
| 15*b* | 9*a* | 595 | do | 395 | do | Xylene, 550 g | 20–24 | 29 | 147 |
| 16*b* | 2*a* | 441 | Amine 17 | 99 | do | Xylene, 440 g | 20–21 | 30 | 148 |
| 17*b* | 5*a* | 480 | do | 99 | do | Xylene, 480 g | 21–26 | 32 | 146 |
| 18*b* | 14*a* | 511 | do | 99 | do | Xylene, 600 g | 21–23 | 26 | 147 |
| 19*b* | 22*a* | 498 | Amine 18 | 113 | do | Xylene, 500 g | 21–32 | 29 | 150 |
| 20*b* | 23*a* | 542 | do | 113 | do | do | 21–30 | 32 | 150 |
| 21*b* | 25*a* | 547 | do | 113 | do | Xylene, 550 g | 21–23 | 37 | 150 |
| 22*b* | 2*a* | 441 | Amine 19 | 126 | do | Xylene, 440 g | 20–22 | 30 | 150 |
| 23*b* | 26*a* | 595 | do | 126 | do | Xylene, 600 g | 20–25 | 36 | 149 |
| 24*b* | 27*a* | 391 | do | 126 | 30%, 50 g | Xylene, 400 g | 20–24 | 32 | 152 |

The amine numbers referred to are the ring compounds identified previously by number in Part 3.

PART 5

The conversion of the basic condensate of the kind previously described into the corresponding salt of gluconic acid is a simple operation since it is nothing more nor less than neutralization. The condensates invariably contain more than two basic nitrogen atoms. One can neutralize either one, or more, basic nitrogen atoms.

Gluconic acid is available as a 50% solution. Dehydration causes decomposition. This is not true of the salts, at least not of the salts of the herein described condensates. Such salts appear to be stable, or stable for all practical purposes, at temperatures slightly above the boiling point of water and perhaps at temperatures as high as 150° C. or thereabouts.

For reasons pointed out previously, it is most convenient to handle the condensate as a solution, generally a solution in an inexpensive solvent, such as benzene, xylene, an aromatic petroleum solvent, or the like. A number of the condensates previously described have been prepared in 50% solution as noted. Adding the calculated stoichiometric amount of 50% gluconic acid, calculated on the basis of the theoretical basic nitrogen atoms present, forms such salt which, in many instances may be slightly on the basic side and in other instances perhaps slightly on the acid side. The salt formation is merely a matter of agitating at room temperature, or somewhat higher temperature if desired, particularly under a reflux condenser. After salt formation is complete, I have permitted the solution to stand for about 6 to 72 hours. Sometimes, depending on the composition, there is some separation of an aqueous phase. On a laboratory scale, this procedure is conducted in a separatory funnel. If there is separation of an aqueous phase, the aqueous phase is discarded and the solution can be brought back to a predetermined concentration by the addition of a hydrocarbon solvent, such as xylene, or by the addition of an alcohol, such as methyl, ethyl, or propyl alcohol; or, if need by, one can employ a bridge solvent having hydrotropic properties in case of the diethylether of ethyleneglycol, or similar solvents.

The gluconic salts can be obtained in non-aqueous solution by using a slightly modified procedure. The procedure depends on the fact that the phase-separating trap can be used but it is preferable to stay below 150° C. so as to avoid any possible decomposition.

The xylene solution of the condensate, as previously described, is subjected to vacuum distillation so as to remove about one-half the xylene. Approximately two-thirds of the xylene removed is replaced by benzene. This mixed solvent combination is subjected to refluxing action under a condenser with a phase-separating trap. With the distillation point adjusted so as to be somewhere between 110° to 135° C. the mixture is refluxed and the water separated. If it is not within this range more benzene is added or, if need be, a little more xylene is added to bring it within the range. By this method the phase-separating trap eliminates the water. The temperature at all times is left below 140° C. At the end of the separation a suitable amount of solvent is added, or eliminated, by distillation so as to yield a solution of predetermined concentration, for instance, 50%.

Using a somewhat similar procedure one can obtain the solvent-free material by merely subjecting the xylene solution of the condensate to vacuum distillation so as to remove all the xylene. The condensate itself is perfectly stable at 150° C. or thereabouts and, thus, there is no particular danger of degradation involved in this step. The solvent-free material is then dissolved in benzene instead of xylene and water eliminated in the manner previously described. The benzene is eliminated by vacuum distillation in such a way that the temperature never gets above 135° C. or 140° C. Actually, with care the solution previously described, to wit, the xylene-benzene solution, also can be removed without decomposition.

An examination of the basic cyclic amidines employed indicates there may be present at least three sub-genera. One sub-genera includes the type in which there is present a residual secondary amino group; another sub-genera includes the type in which there is present a hydroxyl group, such as an ethanol group; and a third sub-genera contains both these reactive groups. When such products are neutralized, particularly when neutralization is complete, it becomes apparent that one has a material which, in one way, is analogous to triethanolamine oleate; or, for that matter, triethanolamine gluconate. In another way the analogy is similar to diethanolamine oleate or diethanolamine gluconate. If diethanolamine oleate is heated it can be converted into oleyl diethanolamine, i. e., involving an ester linkage. Similarly, if diethanolamine oleate is heated one can form the corresponding amide or perhaps under certain conditions, the corresponding ester. Obviously, esters can invariably and inevitably form in regard to the completely neutralized product and even in some cases in regard to the partially neutralized product. This is, of course, assuming that appropriate conditions of reaction are selected. In other instances where there is a residual secondary amine radical one may form amides or, for that matter mixtures of both amides and esters. For this reason previous reference to decomposition must be construed to mean not only decomposition in the sense that degradation or inner ethers are formed, but also in the sense that an entirely new and valuable compound, or compounds, may be formed. Such reactions, of course, form water as a by-product regardless of whether amidification or esterification is involved.

*Example 1c*

This salt was made from condensate Example 1*b*. Example 1*b*, in turn, was made from Resin 2*a* and Amine 3 previously described in Part 3, preceding. 882 grams of the resin were dissolved in about 600 grams of xylene and reacted with 612 grams of the cyclic amidine previously identified as Amine 3, along with 162 grams of 37% formaldehyde. All this has been described previously. The weight of the condensate on a solvent-free basis was 1518 grams. This represented approximately 53 grams of basic nitrogen subject to what is said in the note following Table III which, in turn, immediately follows the present text.

To the above mixture, with constant stirring, there were added 1480 grams of 50% gluconic acid. The mixture was stirred for one hour. This solution was poured into a separatory funnel or syphon arrangement and allowed to stand for about two days at 40° C. There was at the most a slight separation of insoluble material at the bottom of the separatory funnel. This was withdrawn and 100 grams of isopropyl alcohol added and enough xylene to bring the final product to approximately a 50% solution.

A number of other examples are included in Table III, following.

TABLE III

| Salt ex. No. | Salt from condensate No. | Condensate in turn derived from— | | | | | | | Salt formation | | | |
|---|---|---|---|---|---|---|---|---|---|---|---|---|
| | | Resin No. | Amt. resin, gms. | Solvent | Amt. solvent, gms. | Amine used [1] | Amine used, gms. | 37% formaldehyde, gms. [2] | Wt. of condensate on solvent-free basis, gms. | Theoretical basic nitrogen, gms. [3] | 50% gluconic acid, gms. | Final wt. adjusted to approx. 50% salt, 50% solv., gms. |
| 1*c* | 1*b* | 2*a* | 882 | Xylene | 600 | Amine 3 | 612 | 162 | 1,518 | 53 | 1,480 | 4,516 |
| 2*c* | 2*b* | 5*a* | 480 | do | 450 | do | 306 | 81 | 798 | 27 | 720 | 2,316 |
| 3*c* | 3*b* | 10*a* | 633 | do | 600 | do | 306 | 81 | 951 | 27 | 720 | 2,622 |
| 4*c* | 4*b* | 2*a* | 441 | do | 400 | Amine 4 | 281 | [2] 100 | 734 | 38 | 1,065 | 2,533 |
| 5*c* | 5*b* | 5*a* | 480 | do | 450 | do | 281 | [2] 100 | 773 | 38 | 1,065 | 2,571 |
| 6*c* | 6*b* | 10*a* | 633 | do | 600 | do | 281 | 81 | 826 | 38 | 1,065 | 2,717 |
| 7*c* | 7*b* | 2*a* | 441 | do | 400 | Amine 5 | 394 | 81 | 847 | 42 | 1,175 | 2,869 |
| 8*c* | 8*b* | 5*a* | 480 | do | 450 | do | 394 | 81 | 886 | 42 | 1,175 | 2,947 |
| 9*c* | 9*b* | 10*a* | 633 | do | 600 | do | 394 | 81 | 1,039 | 42 | 1,175 | 3,253 |
| 10*c* | 13*b* | 2*a* | 473 | do | 450 | Amine 13 | 395 | [2] 100 | 880 | 42 | 1,175 | 2,935 |
| 11*c* | 14*b* | 5*a* | 511 | do | 500 | do | 395 | [2] 100 | 916 | 42 | 1,175 | 3,007 |
| 12*c* | 15*b* | 10*a* | 655 | do | 650 | do | 395 | [2] 100 | 1,069 | 42 | 1,175 | 3,313 |
| 13*c* | 1*b* | 2*a* | 882 | do | 600 | Amine 3 | 612 | 162 | 1,518 | 27 | 720 | 3,756 |
| 14*c* | 4*b* | 2*a* | 441 | do | 400 | Amine 4 | 281 | [2] 100 | 734 | 19 | 535 | 2,003 |
| 15*c* | 13*b* | 2*a* | 473 | do | 450 | Amine 13 | 395 | [2] 100 | 880 | 21 | 585 | 2,345 |

[1] For identification of amine numbers see ring compounds in Part 3.
[2] 30% formaldehyde.
[3] See text following.

Ordinarily the two nitrogens in the ring compound give a basic effect less than the equivalent of two separate nitrogen atoms but in the order of 1.7 nitrogen atom. In some examples, particularly 1*c*, 2*c*, 3*c*, and 10*c*, 11*c*, 12*c*, together with 13*c* and 15*c*, the amount of ring compound was somewhat in excess of the molecular portion of 2, 1 and 2 in condensate formation. These two factors explain variation in amount of gluconic acid used for salt formation.

PART 6

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing the present process, the treating or demulsifying agent is used in the conventional way, well known to the art, described, for example, in Patent 2,626,929, dated January 27, 1953, Part 3, and reference is made thereto for a description of conventional procedures of demulsifying, including batch, continuous, and down-the-hole demulsification, the process essentially involving introducing a small amount of demulsifier into a large amount of emulsion with adequate admixture with or without the application of heat, and allowing the mixture to stratify.

As noted above, the products herein described may be used not only in diluted form, but also may be used admixed with some other chemical demulsifier. A mixture which illustrates such combination is the following:

Gluconic acid salt, for example, the product of Example 1*c*, 20%;

A cyclohexylamine salt of a polypropylated napthalene monosulfonic acid, 24%;

An ammonium salt of a polypropylated napthalene monosulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

Having thus described my invention what I claim as new and desire to secure by Letters Patent, is:

1. A process for breaking petroleum emulsions of the water-in-oil type characterized by subjecting the emulsion to the action of a demulsifier including the gluconic acid salts of the basic products obtained in turn in the process of condensing (*a*) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

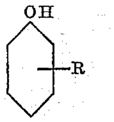

in which R is an aliphatic hydrocarbon radical having at least 4 and not more than 24 carbon atoms and substituted in the 2,4,6 position; (*b*) cyclic amidines selected from the class consisting of substituted imidazolines and substituted tetrahydropyrimidines in which there is present at least one basic secondary amino radical and characterized by freedom from any primary amino radical; and (*c*) formaldehyde; said condensation reaction being conducted at a temperature sufficiently high to eliminate water and below the pyrolytic point of the reactants and resultants of reaction; and with the proviso that the resinous condensation product resulting from the process be heat-stable.

2. A process for breaking petroleum emulsions of the water-in-oil type characterized by subjecting the emulsion to the action of a demulsifier including the gluconic acid salts of the basic products obtained in turn in the process of condensing (*a*) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

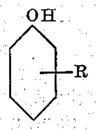

in which R is an aliphatic hydrocarbon radical having at least 4 and not more than 24 carbon atoms and substituted in the 2,4,6 position; (*b*) cyclic amidines selected from the class consisting of substituted imidazolines and substituted tetrahydropyrimidines in which there is present at least one basic secondary amino radical and characterized by freedom from any primary amino radical; and (*c*) formaldehyde; said condensation reaction being conducted at a temperature sufficiently high to eliminate water and below the pyrolytic point of the reactants and resultants of reaction; with the added proviso that the condensation reaction be conducted so as to produce a significant portion of the resultant in which each of the three reactants have contributed part of the ultimate molecule; and with the further proviso that the resinous condensation product resulting from the process be heat-stable.

3. A process for breaking petroleum emulsions of the water-in-oil type characterized by subjecting the emulsion to the action of a demulsifier including the gluconic acid salts of the basic products obtained in turn in the process of condensing (*a*) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

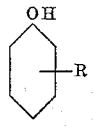

in which R is an aliphatic hydrocarbon radical having at least 4 and not more than 24 carbon atoms and substituted in the 2,4,6 positions; (*b*) cyclic amidines selected from the class consisting of substituted imidazolines and substituted tetrahydropyrimidines in which there is present at least one basic secondary amino radical and characterized by freedom from any primary amino radical; and (*c*) formaldehyde; said condensation reaction being conducted at a temperature sufficiently high to eliminate water and below the pyrolytic point of the reactants and resultants of reaction, with the proviso that the condensation reaction be conducted so as to produce a significant portion of the resultant in which each of the three reactants have contributed part of the ultimate molecule by virtue of a formaldehyde-derived methylene bridge connecting the amino nitrogen atom with a resin molecule; and with the further proviso that the resinous condensation product resulting from the process be heat-stable.

4. A process for breaking petroleum emulsions of the water-in-oil type characterized by subjecting the emulsion to the action of a demulsifier including the gluconic acid salts of the basic products obtained in turn in the process of condensing (*a*) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

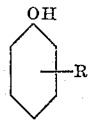

in which R is an aliphatic hydrocarbon radical having at least 4 and not more than 24 carbon atoms and substituted in the 2,4,6 position; (*b*) cyclic amidines selected from the class consisting of substituted imidazolines and substituted tetrahydropyrimidines in which there is present at least one basic secondary amino radical and characterized by freedom from any primary amino radical; and (*c*) formaldehyde; said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a formaldehyde-derived methylene bridge connecting the amino nitrogen atom with a resin molecule; with the further proviso that the molar ratio of reactants be approximately 1,2 and 2 respectively; and with the final proviso that the resinous condensation product resulting from the process be heat-stable.

5. A process for breaking petroleum emulsions of the water-in-oil type characterized by subjecting the emulsion to the action of a demulsifier including the gluconic acid salts of the basic products obtained in turn in the process of condensing (*a*) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

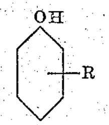

in which R is an aliphatic hydrocarbon radical having at least 4 and not more than 24 carbon atoms and substituted in the 2,4,6 position; (*b*) cyclic amidines selected from the class consisting of substituted imidazolines and substituted tetrahydropyrimidines in which there is present at least one basic secondary amino radical and characterized by freedom from any primary amino radical; and (*c*) formaldehyde; said condensation reaction being conducted at a temperature sufficiently high to eliminate water and below the pyrolytic point of the reactants and resultants of reaction, with the proviso that the condensation reaction be conducted so as to produce a significant portion of the resultant in which each of the three reactants have contributed part of the ultimate molecule by virtue of a formaldehyde-derived methylene bridge connecting the amino nitrogen atom with a resin molecule; with the added proviso that the molar ratio of reactants be approximately 1,2 and 2 respectively; with the further proviso that said procedure involve the use of a solvent; and with the final proviso that the resinous condensation product resulting from the process be heat-stable.

6. A process for breaking petroleum emulsions of the water-in-oil type characterized by subjecting the emulsion to the action of a demulsifier including the gluconic acid salts of the basic products obtained in turn in the process of condensing (*a*) an oxyethylation-susceptible, fusible, non-oxygenated organic solvent-soluble, water-insoluble, low-stage phenol-formaldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and formaldehyde; said resin being formed in the substantial absence of trifunctional phenols; said phenol being of the formula

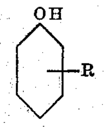

in which R is an aliphatic hydrocarbon radical having at least 4 and not more than 24 carbon atoms and substituted in the 2,4,6 position; (b) cyclic amidines selected from the class consisting of substituted imidazolines and substituted tetrahydropyrimidines in which there is present at least one basic secondary amino radical and characterized by freedom from any primary amino radical; and (*c*) formaldehyde; said condensation reaction being conducted at a temperature sufficiently high to eliminate water and below the pyrolytic point of the reactants and resultants of reaction, with the proviso that the condensation reaction be conducted so as to produce a significant portion of the resultant in which each of the three reactants have contributed part of the ultimate molecule by virtue of a formaldehyde-derived methylene bridge connecting the amino nitrogen atom with a resin molecule; with the added proviso that the molar ratio of reactants be approximaely 1,2 and 2, respectively; with the further proviso that said procedure involve the use of a solvent; and with the final proviso that the resinous condensation product resulting from the process be heat-stable.

7. A process for breaking petroleum emulsions of the water-in-oil type characterized by subjecting the emulsion to the action of a demulsifier including the gluconic acid salts of the basic products obtained in turn in the process of condensing (*a*) an oxyethylation-susceptible, fusible, non-oxygenated organic solvent-soluble, water-insoluble, low-stage phenol-formaldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and formaldehyde; said resin being formed in the substantial absence of trifunctional phenols; said phenol being of the formula

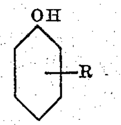

in which R is an aliphatic hydrocarbon radical having at least 4 and not more than 14 carbon atoms and substituted in the 2,4,6 position; (*b*) cyclic amidines selected from the class consisting of substituted imidazolines and substituted tetrahydropyrimidines in which there is present at least one basic secondary amino radical and characterized by freedom from any primary amino radical; and (*c*) formaldehyde; said condensation reaction being conducted at a temperature sufficiently high to eliminate water and below the pyrolytic point of the reactants and resultants of reaction, with the proviso that the condensation reaction be conducted so as to produce a significant portion of the resultant in which each of the three reactants have contributed part of the ultimate molecule by virtue of a formaldehyde-derived methylene bridge connecting the amino nitrogen atom with a resin molecule; with the added proviso that the molar ratio of reactants be approximately 1,2 and 2, respectively; with the further proviso that said procedure involve the use of a solvent; and with the final proviso that the resinous condensation product resulting from the process be heat-stable.

8. A process for breaking petroleum emulsion of the water-in-oil type characterized by subjecting the emulsion to the action of a demulsifier including the gluconic acid salts of the basic products obtained in turn in the process of condensing (*a*) an oxyethylation-susceptible, fusible, non-oxygenated organic solvent-soluble, water-insoluble, low-stage phenol-formaldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and formaldehyde; said resin being formed in the substantial absence of trifunctional phenols; said phenol being of the formula

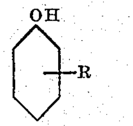

in which R is an aliphatic hydrocarbon radical having at least 4 and not more than 14 carbon atoms and substituted in the 2,4,6 position; (*b*) cyclic amidines selected from the class consisting of substituted imidazolines and substituted tetrahydropyrimidines in which there is present at least one basic secondary amino radical and characterized by freedom from any primary amino radical; and (*c*) formaldehyde; said condensation reaction being conducted at a temperature above the boiling point of water and below 150° C., with the proviso that the condensation reaction be conducted so as to produce a significant portion of the resultant in which each of the three reactants have contributed part of the ultimate molecule by virtue of a formaldehyde-derived methylene bridge connecting the amino nitrogen atom with a resin molecule; with the added proviso that the molar ratio of reactants be approximately 1,2 and 2, respectively; with the further proviso that said procedure involve the use of a solvent; and with the final proviso that the resinous condensation product resulting from the process be heat-stable.

9. A process for breaking petroleum emulsions of the water-in-oil type characterized by subjecting the emulsion to the action of a demulsifier including the gluconic acid salts of the basic products obtained in turn in the process of condensing (*a*) an oxyethylation-susceptible, fusible, non-oxygenated organic solvent-soluble, water-insoluble, low-stage phenol-formaldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and formaldehyde; said resin being formed in the substantial absence of trifunctional phenols; said phenol being of the formula

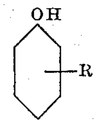

in which R is an aliphatic hydrocarbon radical having at least 4 and not more than 14 carbon atoms and substituted in the para position; (*b*) cyclic amidines selected from the class consisting of substituted imidazolines and substituted tetrahydropyrimidines in which there is present at least one basic secondary amino radical and characterized by freedom from any primary amino radical; and (*c*) formaldehyde; said condensation reaction being conducted at a temperature above the boiling point of water and below 150° C., with the proviso that the condensation reaction be conducted so as to produce a significant portion of the resultant in which each of the three reactants have contributed part of the ultimate molecule by virtue of a formaldehyde-derived methylene bridge connecting the amino nitrogen atom with a resin molecule; with the added proviso that the molar ratio of reactants be approximately 1,2 and 2, respectively; with the further proviso that said procedure involve the use of a solvent; and with the final proviso that the resinous condensation product resulting from the process be heat-stable.

10. The process of claim 1 with the proviso that the hydrophile properties of the gluconic acid salt of the basic product in an equal weight of xylene are sufficient to produce an emulsion when said xylene solution is shaken vigorously with 1 to 3 volumes of water.

11. The process of claim 2 with the proviso that the hydrophile properties of the gluconic acid salt of the basic product in an equal weight of xylene are sufficient to produce an emulsion when said xylene solution is shaken vigorously with 1 to 3 volumes of water.

12. The process of claim 3 with the proviso that the hydrophile properties of the gluconic acid salt of the basic product in an equal weight of xylene are sufficient to produce an emulsion when said xylene solution is shaken vigorously with 1 to 3 volumes of water.

13. The process of claim 4 with the proviso that the hydrophile properties of the gluconic acid salt of the basic product in an equal weight of xylene are sufficient to produce an emulsion when said xylene solution is shaken vigorously with 1 to 3 volumes of water.

14. The process of claim 5 with the proviso that the hydrophile properties of the gluconic acid salt of the basic product in an equal weight of xylene are sufficient to produce an emulsion when said xylene solution is shaken vigorously with 1 to 3 volumes of water.

15. The process of claim 6 with the proviso that the hydrophile properties of the gluconic acid salt of the basic product in an equal weight of xylene are sufficient to produce an emulsion when said xylene solution is shaken vigorously with 1 to 3 volumes of water.

16. The process of claim 7 with the proviso that the hydrophile properties of the gluconic acid salt of the basic product in an equal weight of xylene are sufficient to produce an emulsion when said xylene solution is shaken vigorously with 1 to 3 volumes of water.

17. The process of claim 8 with the proviso that the hydrophile properties of the gluconic acid salt of the basic product in an equal weight of xylene are sufficient to produce an emulsion when said xylene solution is shaken vigorously with 1 to 3 volumes of water.

18. The process of claim 9 with the proviso that the hydrophile properties of the gluconic acid salt of the basic product in an equal weight of xylene are sufficient to produce an emulsion when said xylene solution is shaken vigorously with 1 to 3 volumes of water.

References Cited in the file of this patent

UNITED STATES PATENTS

| | | |
|---|---|---|
| 2,031,557 | Bruson | Feb. 18, 1936 |
| 2,451,153 | Charlton et al. | Oct. 12, 1948 |
| 2,456,357 | Allen | Dec. 14, 1948 |
| 2,457,634 | Bond et al. | Dec. 28, 1948 |
| 2,542,001 | De Groote et al. | Feb. 20, 1951 |
| 2,568,739 | Kirkpatrick et al. | Sept. 25, 1951 |
| 2,679,488 | De Groote | May 25, 1954 |